(12) United States Patent
Rothschild

(10) Patent No.: US 7,698,164 B2
(45) Date of Patent: Apr. 13, 2010

(54) METHOD AND SYSTEM FOR PROVIDING A PAYMENT INCENTIVE FOR DISTRIBUTING DIGITAL FILES OVER A NETWORK

(75) Inventor: Leigh M. Rothschild, Plantation, FL (US)

(73) Assignee: Reagan Inventions, LLC, Sunny Isles Beach, FL (US)

( * ) Notice: Subject to any disclaimer, the term of this patent is extended or adjusted under 35 U.S.C. 154(b) by 475 days.

(21) Appl. No.: 11/373,322

(22) Filed: Mar. 10, 2006

(65) Prior Publication Data

US 2007/0214211 A1 Sep. 13, 2007

(51) Int. Cl.
*G06Q 30/00* (2006.01)

(52) U.S. Cl. .................. 705/14.34; 705/14.1; 705/14.7; 705/14.13; 705/14.14; 705/14.15; 705/14.16; 705/14.21; 705/14.24; 705/14.45; 705/14.48; 705/14.51; 705/14.52

(58) Field of Classification Search .............. 705/14, 705/26, 1, 37, 14.1, 14.7, 14.13, 14.14, 14.15, 705/14.16, 14.21, 14.24, 14.34, 14.45, 14.51, 705/14.52; 707/100; 709/203
See application file for complete search history.

(56) References Cited

U.S. PATENT DOCUMENTS

| | | | | |
|---|---|---|---|---|
| 6,049,778 A | * | 4/2000 | Walker et al. ................. 705/14 |
| 6,101,484 A | * | 8/2000 | Halbert et al. ................ 705/26 |
| 6,260,024 B1 | * | 7/2001 | Shkedy ......................... 705/37 |
| 6,269,343 B1 | * | 7/2001 | Pallakoff ...................... 705/26 |
| 6,385,596 B1 | * | 5/2002 | Wiser et al. .................... 705/51 |
| 6,882,979 B1 | * | 4/2005 | Reay et al. .................... 705/26 |
| 6,983,371 B1 | * | 1/2006 | Hurtado et al. ............. 713/189 |
| 7,124,107 B1 | * | 10/2006 | Pishevar et al. ............... 705/37 |
| 7,209,892 B1 | * | 4/2007 | Galuten et al. ................ 705/26 |
| 7,318,041 B2 | * | 1/2008 | Walker et al. ............ 705/14.26 |
| 2003/0220863 A1 | * | 11/2003 | Holm et al. ................... 705/37 |

* cited by examiner

*Primary Examiner*—James W Myhre
*Assistant Examiner*—Kris Mittal
(74) *Attorney, Agent, or Firm*—Anthony J. Casella; Gerald E. Hespos

(57) ABSTRACT

A method and system for providing a payment incentive for distributing digital files over a network are provided. The method and system allow a publisher, distributor(s), and/or users to receive a payment incentive for downloading digital files on the Internet. The present disclosure creates a method and system where every party along the distribution chain will have an incentive for further distribution of the digital content file. The method includes the steps receiving by a server of a file agent at least one digital content file from a content provider; presenting the at least one digital content file for purchase; downloading the at least one digital content file to at least one user for a transaction amount; distributing a first distribution amount of the transaction amount to the content provider; and distributing a second distribution amount of the transaction amount to the at least one user.

18 Claims, 4 Drawing Sheets

METHOD AND SYSTEM FOR PROVIDING A PAYMENT INCENTIVE FOR DISTRIBUTING DIGITAL FILES OVER A NETWORK

BACKGROUND

1. Field

The present disclosure relates generally to digital content distribution systems, and more particularly, to a method and system for providing a payment incentive for distributing digital files over a network.

2. Description of the Related Art

Many millions of digital files are now stored on the Global Computer Network (GCN) know as the Internet. These files take on many forms including but not limited to text files (in many file formats including Microsoft Word, Adobe PDF, and other formats), video files (including Mpeg-2-3-4, wmv, quicktime, real video, dmrv, and other formats), picture files (including jpg, bmp, tiff, and other formats), audio files (including aac, wma, mp3, and other formats) and other file types.

Commonly, these files are posted on the GCN for others to utilize. The process of posting the file can be referred to as uploading the file. The process of accessing the file can be referred to as downloading the file.

Increasingly digital file downloads are purchased in e-commerce transactions. Examples of companies that sell digital files online are numerous and include Apple Computer, Inc. of Cupertino, Calif. who sells music files in its iTunes branded audio store. Typically, the user pays for these files in an e-commerce transaction and then downloads them from the iTunes remote server. Additionally, Audible.com of Wayne, N.J. also sells audio files, e.g., audio books, audio magazines, etc., to 'listeners' who pay for the files and then download them to a personal computer or other media playback device. Other examples include CNN Pipeline of Atlanta, Ga. who sells streaming video files that the user downloads (or streams) to his/her computer and Amazon.com of Seattle, Wash. who sells text files, e.g., e-books.

Increasingly, creators of digital content are utilizing the GCN as a means for selling their digital content and a source of revenue. The challenge for a creator and/or publisher of digital content is to cause that content to be widely purchased by GCN users, which will correspondingly give the creator/publisher increased revenue and income. However, the challenge of achieving wide distribution of digital content does not have an easy solution. The digital content creator/publisher has substantial competition in the marketplace and increasing costs in order to make users to be aware of their content.

Therefore, a need exists for techniques that will allow a creator/publisher of digital content to enjoy wide distribution at a much lower cost per user as compared to conventional digital distribution models.

SUMMARY

A method and system for providing a payment incentive for distributing digital files over a network are provided. The method and system allow a publisher, distributor(s), and/or users to receive a payment incentive for downloading digital files on the Global Computer Network, e.g., the Internet. The present disclosure creates a method and system that will be viral in terms of the desire to distribute and utilize these files and to receive payment for the utilization of the files.

According to one aspect of the present disclosure, a method for distributing digital content files over a network is provided. The method includes the steps receiving by a server of a file agent at least one digital content file from a content provider; presenting the at least one digital content file for purchase; downloading the at least one digital content file to at least one user for a transaction amount; distributing a first distribution amount of the transaction amount to the content provider; and distributing a second distribution amount of the transaction amount to the at least one user. The at least one digital content file is an audio file, a video file, a text file, a multimedia file or a software application.

In another aspect, the method includes the step determining the second distribution amount including selecting a user distribution percentage; selecting a plurality of user threshold levels; and determining the second distribution amount by the following formula:

$$\left(\begin{array}{c}\text{purchase transaction}\\\text{amount}\end{array}\right) * \left(\begin{array}{c}\text{user distribution}\\\text{percentage}\end{array}\right) * \left(\frac{\text{present user threshold level } (PUTL)}{PUTL + \begin{array}{c}\text{previous user}\\\text{threshold levels}\end{array}}\right).$$

In a further aspect, the method includes distributing a third distribution amount of the transaction amount to the file agent of the server. Furthermore, the presenting step includes posting a location of the at least one digital content file by a distributor and the method further comprising the step of distributing a fourth distribution amount of the transaction amount to the distributor.

In another aspect, the distribution amounts are determined by distribution percentages and the method includes the steps selecting the first, second, third and fourth distribution percentages by the content provider; and approving the distribution percentages by the file agent of the server.

In yet another aspect, the method includes encrypting the at least one digital file before downloading and transmitting a code to the at least one user for decrypting the at least one digital file after receiving the transaction amount from the at least one user.

In a further aspect, the distributing step includes payment by checks, credits to bank accounts, wire transfer, issuance of cash redemption cards or payment by a payment agent. Alternatively, the distributing step includes issuance of credits to a user account to be used for additional services provided by file agent.

According to another aspect of the present disclosure, a server for distributing digital content files over a network is provided. The server including a communication device for receiving at least one digital content file from a content provider; and a processor for presenting the at least one digital content file for purchase, downloading the at least one digital content file via the communication device to at least one user for a transaction amount, distributing a first distribution amount of the transaction amount to the content provider, and distributing a second distribution amount of the transaction amount to the at least one user.

According to a further aspect of the present disclosure, a program storage device readable by a machine, tangibly embodying a program of instructions executable by the machine to perform method steps for distributing digital content files over a network is provided, the method steps including receiving by the machine at least one digital content file from a content provider; presenting the at least one digital content file for purchase; downloading the at least one digital content file to at least one user for a transaction amount; distributing a first distribution amount of the transaction amount to the content provider; and distributing a second distribution amount of the transaction amount to the at least one user.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
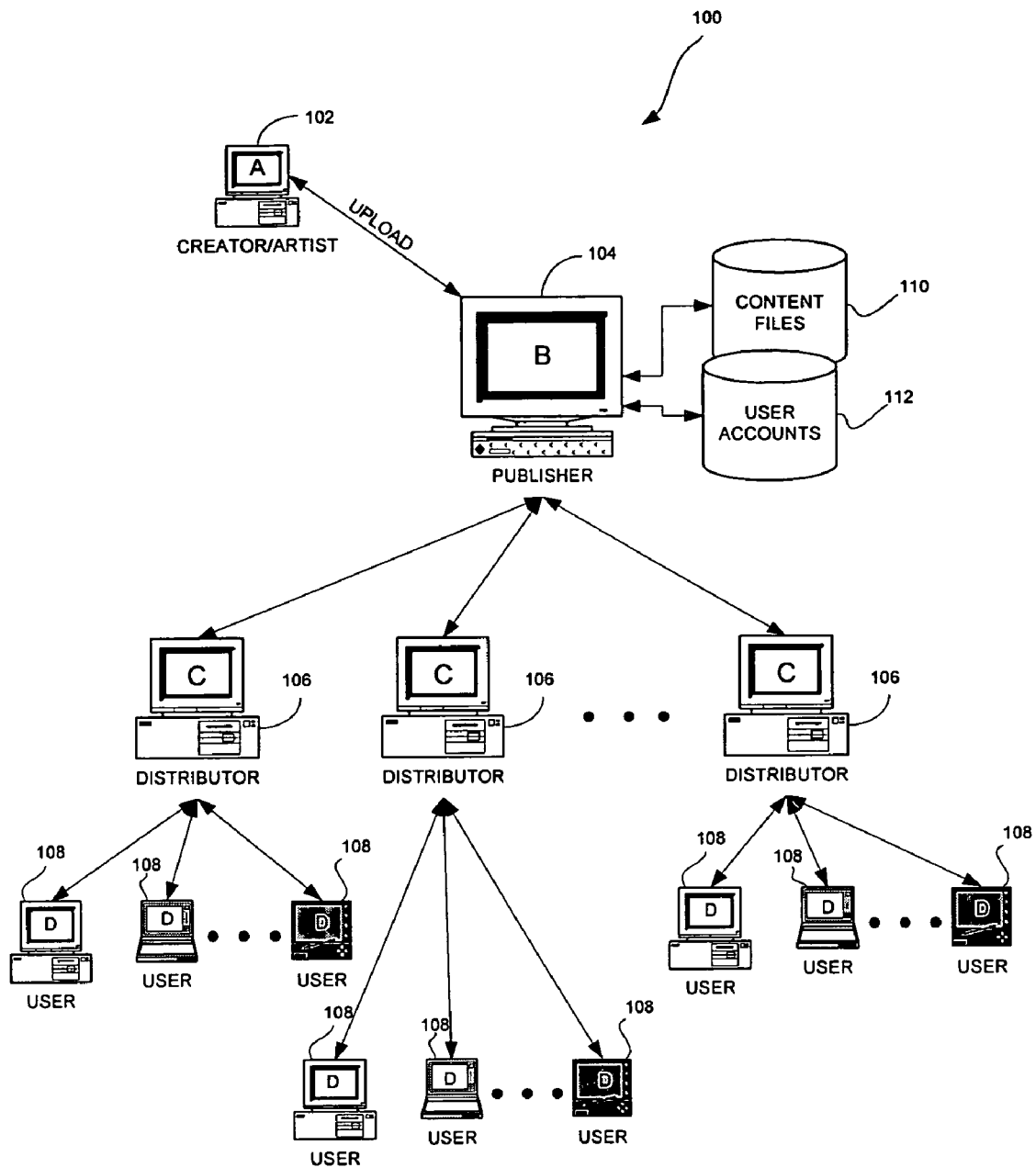
FIG. 1 is a flow diagram of a method and system for providing a payment incentive for distributing digital files over a network in accordance with an embodiment of the present disclosure.

Preferred embodiments of the present disclosure will be described hereinbelow with reference to the accompanying drawings. In the following description, well-known functions or constructions are not described in detail to avoid obscuring the present disclosure in unnecessary detail.

A method and system for providing a payment incentive for distributing digital files over a network are provided. The method and system allow a publisher, distributor(s), and/or users to receive a payment incentive for downloading digital files on the Global Computer Network, e.g., the Internet. The present disclosure creates a method and system where every party along the distribution chain will have an incentive (even an end user) for further distribution of the digital content file.

In utilizing the methods and systems of the present disclosure described herein, a user will be able to accomplish the various applications of the disclosure which are described below in relation to FIG. 1, which illustrates an overall flow diagram of the method and system 100 of the present disclosure.

A digital content creator 102 (hereinafter A) wishes to distribute his content on the global computer network (GCN), e.g., the Internet, and to be paid for this content on a per use basis. It is to be appreciated that for the purpose of the present disclosure digital content or a digital content file may include an audio file, a video file, a text file, a multimedia file, a software application such as games, productivity programs, etc., and various other known digital file types. Creator A uploads the content to a server or storage site 104 for the content on the GCN (hereinafter called B). B, also known as the publisher of the digital content, markets the content on the Internet to let interested parties know of the content. B also acts as the payment agent for the content. Additionally, in another embodiment of this disclosure, creator A may also cause the content to be stored or to have a hyperlink to the content stored on another distributors or multiple distributors websites 106 (hereinafter called C). Examples of these distributors include digital content resellers such as iTunes of Cupertino Calif., and Podcast.com also of California. Once the content is placed with distributors 106, e.g., C, by B, the end users 108 will be able to download the content from the distributors website 106. The users (hereinafter called user D) will have an incentive to purchase the content published by B as follows.

For the first predetermined number of D users to purchase the content from B, B will pay those users a percentage of the revenue collected by B. This money, credits or funds will be placed into an electronic account that B will set up for the D users. Further, for the next predetermined number of D users to purchase the content from B, B will pay those users including the original predetermined users, a percentage of the revenue collected by B. Further, for the next or third predetermined number of D users to purchase the content from B, B will pay those users including the original users, a percentage of the revenue collected by B. This system of incentivation will continue for all D users of the content. B will also pay the content provider (A) a percentage of the revenue, and also will pay the content distributor C (if there is a distributor) a percentage of revenue. The balance of the revenue will be maintained by B.

In a preferred embodiment, B or the publisher 104 of the digital content will be an application service provider (ASP) residing on a server and all transactions to be described will occur electronically, via a hardwired or wireless connection, over a network of computers, e.g., the Internet. Each of the users, e.g., A 102, C 106, D 108, will be coupled to the publisher 104 via a client application, e.g., an Internet browser, and will access the publisher 104 via a web interface, e.g., an HTML constructed web page.

Figure 2:
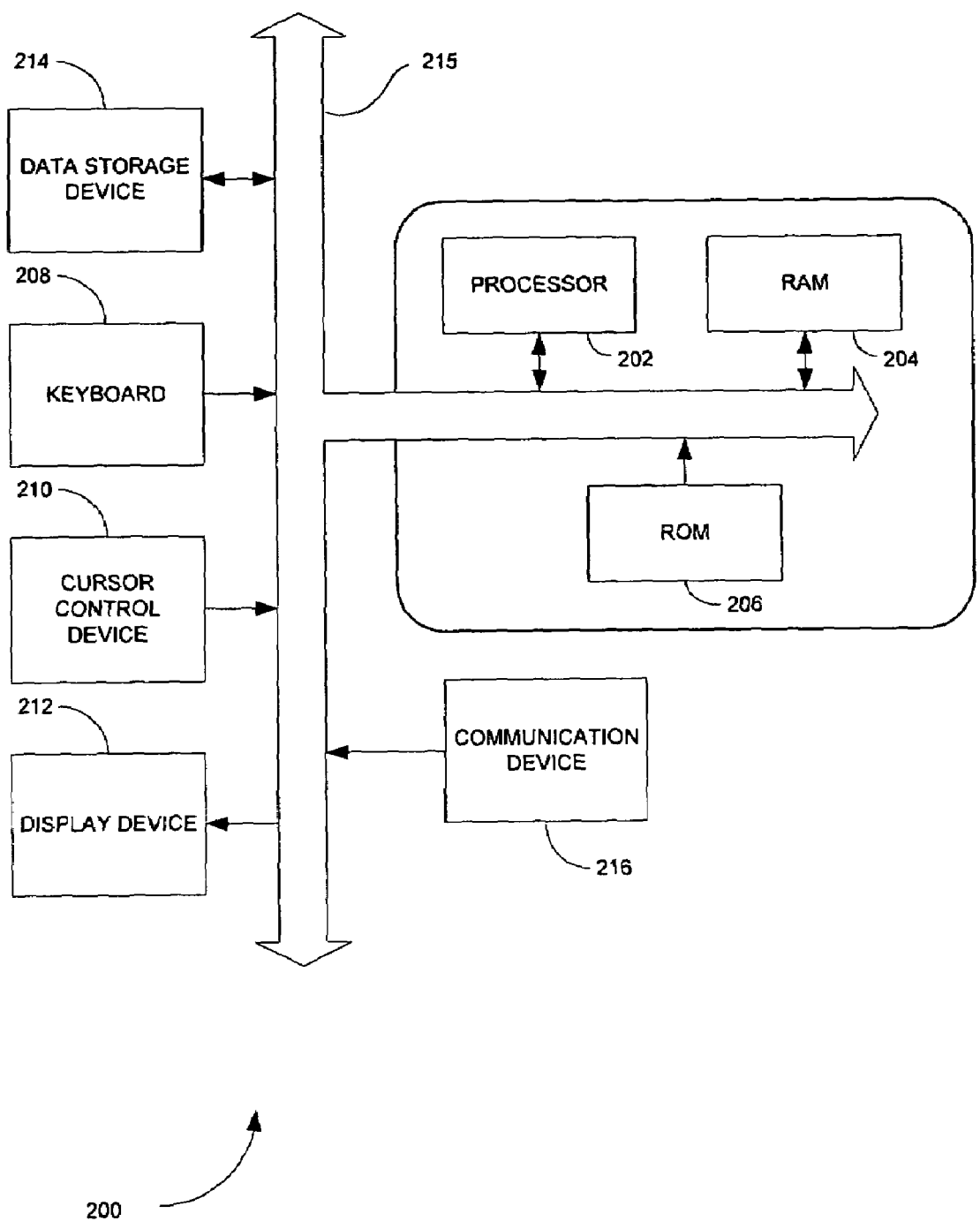
FIG. 2 is an exemplary server for use in the system shown in FIG. 1.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine comprising any suitable architecture such as server 104. Referring to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. A system bus 215 couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform by various interfaces and bus structures, such as a parallel port, serial port or universal serial bus (USB). One such peripheral device may include a communications device 216, e.g., a modem, network interface card (NIC), satellite relay, wireless connection, etc., for enabling communications from the server of the publisher 104 to various clients, e.g., content provider 102, distributor(s) 106 and end user(s) 108, for accessing the digital content files. Other peripheral devices may include additional storage devices 214 and a printer.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The server 104 may operate in a networked environment using logical connections to one or more remote computers. The remote computer(s) may be a personal computer, a server, a router, a network PC, a peer device or other common network node, and typically includes many or all of the elements described above relative to the server 104. It is to be appreciated that the network may be a local area network (LAN), wide area network (WAN), the Internet or any known network that couples a plurality of computers to enable various modes of communication via network messages. Furthermore, the server 104 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 104 will further include a storage medium for storing a repository of digital media content 110 and a database of user accounts 112.

Figure 3:
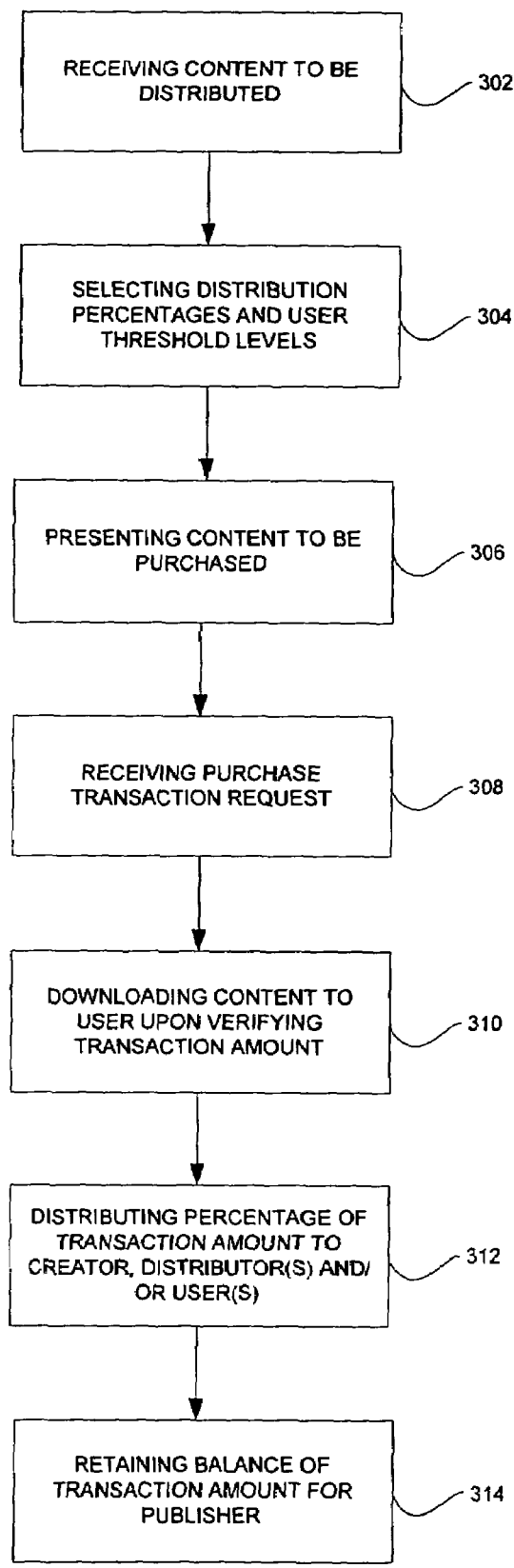
FIG. 3 is a flow diagram illustrating a method for providing a payment incentive for distributing digital files over a network in accordance with an embodiment of the present disclosure.

With reference to FIGS. 1 and 3, the method and system of the present disclosure will now be described.

Initially, a digital file is uploaded by the content provider (A) 102 from a computer terminal to remote server 104 on the GCN (step 302). In this case the file is stored in memory storage 110 on the remote server 104. Alternatively in another embodiment of the present disclosure, the file's address (e.g., a hyperlink to the file) is uploaded from computer terminal 102 to the remote server 104 on the GCN and this file address is stored in memory 110 on the remote server. In this embodiment, the actual digital file would remain on the local server stored in memory storage (e.g., hard drive, flash memory, CD or DVD, etc), or may remain located on another remote server (the distributor C) for access by the users D.

Next, in step 304, the content provider (A) will select with the remote server operator as to the percentages of revenue to share with the user's of the digital content (D), the distributor of the digital content (C), and the initial storage site/agent for the content or the address of the content (B). In one embodiment, the selecting of the distribution percentages will be negotiated electronically between the content provider and the remote server. For example, the content provider will access a web site of the remote server 104 and select the distribution percentages and the publisher/provider of the remote server will approve of the percentages if acceptable or will transmit back to the content provider new percentages. These new percentages may be accepted or rejected by the content provider. If rejected, the content provider will suggest a different set of percentages and will go back and forth with the publisher/provider of the remote server until a set of percentages is mutually agreed upon. The parties would also select as to the number of users that will receive different percentages of revenue, e.g., user threshold levels (UTL). By example, the first 10,000 users will receive 50% of the revenue, and the next 30,000 users including the first 10,000 users to receive 40% of the revenue. As these percentages are adjusted, the revenue given to the file agent (B) and the distributors (C) will also vary so that at the conclusion all parties share a total of 100% of the revenue. Furthermore, when a predetermined threshold of purchases has occurred, e.g., if the content is extremely successful, the content provider may re-negotiate the distribution percentages with the publisher/provider of the remote server.

After the distribution percentages and user threshold levels are set, the digital file is presented to be purchased by a user D. In one embodiment, the digital file will be directly available from the publisher (B) via a website residing on server 104. In another embodiment, the file will be accessible from a distributor (C), e.g., iTunes, Audible.com, etc. Although user D will access a website of the distributor (C), the digital file may reside on memory storage 110 of server 104. Furthermore, server 104 will also store a plurality of user accounts 112 either on the same memory storage device as the content file or on a separate memory storage device. User accounts 112 will be maintained for all users, e.g., A, B, C, D, to keep track of the incentive payment to each user.

In step 308, the server 104 will receive a purchase transaction request from user D and will download the digital file upon verifying the transaction amount, in step 310. The digital file is accessed on the GCN by user (D) and is downloaded through the GCN by the user. In one embodiment of the disclosure, the file is encrypted. Encryption algorithms can include DES, AES, Blowfish, Cast, or any other type of file encryption algorithm currently known or that may be known in the future. The user would then contact the file agent (B) through the GCN and would pay the file agent with a standard e-commerce transaction (including but not limited to payment by credit card, bank debit, payment agent, wire transfer, etc), and the file agent (B) would give the code to the end user (D) and the file would be unencrypted and in usable form. Alternatively, in another embodiment of this disclosure, the user would contact the file agent (B) through the GCN and would pay the file agent with a standard e-commerce transaction (including but not limited to payment by credit card, bank debit, payment agent, wire transfer, etc), and the file agent (B) would give the address of the digital file (including providing a hyperlink to the file) to the user (D) and the file would be able to be accessed and downloaded by the user (D). In this embodiment, the file or file address may be resident at another remote location and be available for download with the file's distributor (C).

Once the file agent/publisher (B) has received payment for the digital file, the agent would then distribute the transaction amount in the percentages agreed to by the agent (B) and the content provider (A), to the content provider (A), the file distributor (C), and the file users (D) (step 312). The file agent/publisher (B) will retain the balance of the transaction amount after distribution (step 314). This distribution of payments may be in any form currently known or that will be known in the future, including payment by checks, credits to bank accounts, wire transfer, issuance of cash redemption cards, payment by a payment agent, or issuance of credits to be used for additional services provided by file agent/publisher (B). In one embodiment, the file agent/publisher will track the distributed funds for each user in user accounts 112 and only transfer credit to the user upon the user's account exceeding a predetermined amount. The credit in the user account may be used for purchasing other digital content files maintained by the file agent (B).

Figure 4:
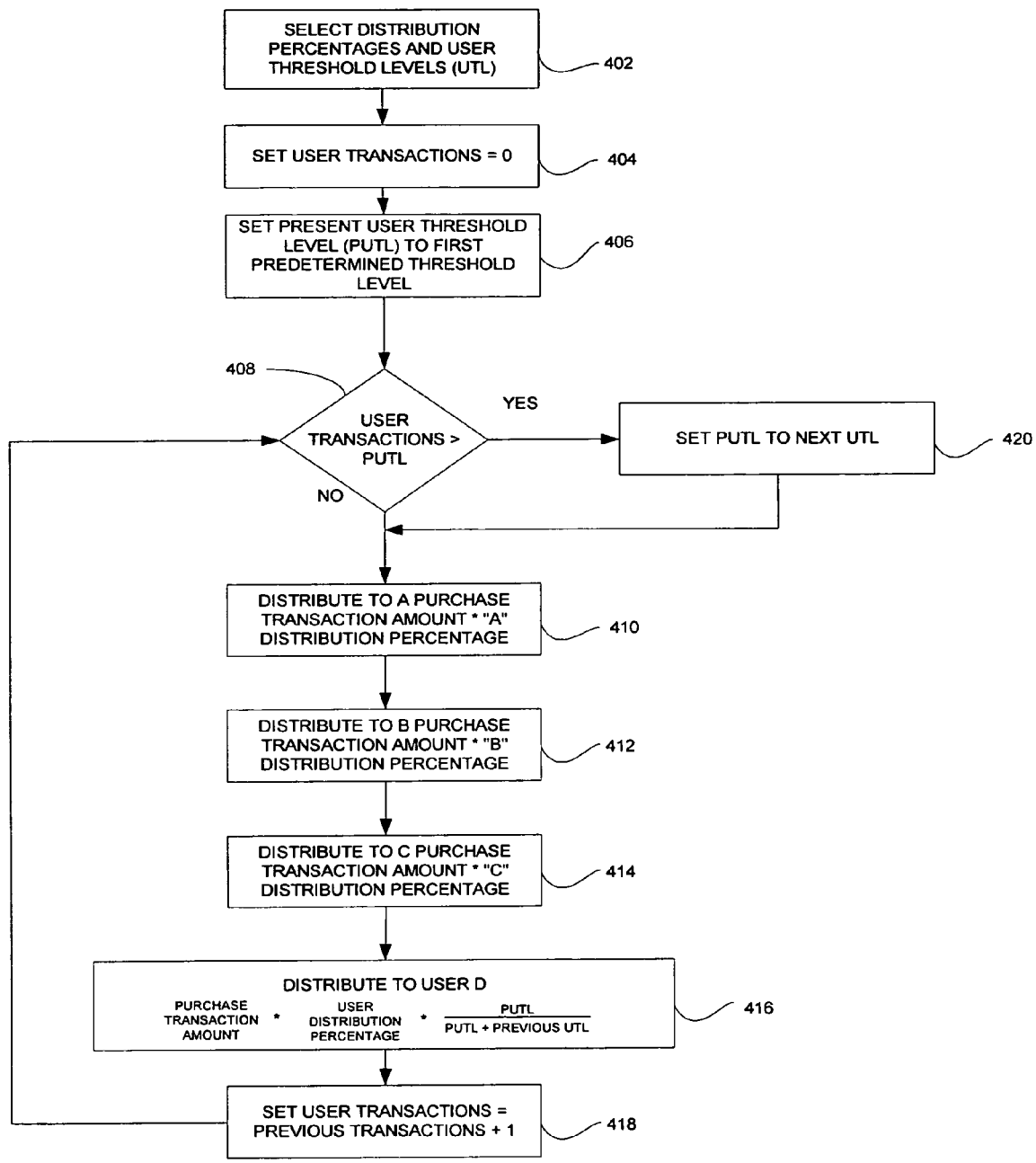
FIG. 4 is a flow diagram illustrating a method for determining a distribution amount to be paid to an end user.

Referring to FIG. 4, an illustrative example of the method of the present disclosure is provided. Initially, in step 402, a content provider (A) uploads a file to B and A and B agree to distribute the file with the following payments—20% of the gross revenue to A, 10% to B, and for the first 1000 users (D) 50% of the revenue. Additionally, the distributor (C) will receive 20% of the revenue. Furthermore, the user threshold levels (UTLs) will be predetermined to be 1000; 10,000; 100,000; and 1,000,000.

In step 404, the number of user transactions associated with the uploaded file will be set to zero and the present user threshold level (PUTL) will be set to the first predetermined user threshold level (UTL), for this example 1000 users, in step 406.

In this example, the digital file will sell for $15.00. Thus, in the 'first round', the server 104 will determine if the number of user transactions is greater than the first user threshold level (step 408). Since initially, the user transactions is set to zero, B will distribute the purchase transaction amount according to the agreed upon percentages for the first UTL; in step 410, distribute to A an amount equal to the purchase transaction amount times the "A" distribution percentage (20%) or $3.00; in step 412, distribute to B an amount equal to the purchase transaction amount times the "B" distribution percentage (10%) or $1.50; and in step 414, distribute to C an amount equal to the purchase transaction amount times the "C" distribution percentage (20%) or $3.00. The distribution to each of the D users will depend on the user threshold level and will be determined by the following formula:

$$\left(\begin{array}{c}\text{purchase transaction}\\\text{amount}\end{array}\right) * \left(\begin{array}{c}\text{user distribution}\\\text{percentage}\end{array}\right) * \left(\frac{\text{present user threshold level (PUTL)}}{PUTL + \begin{array}{c}\text{previous user}\\\text{threshold level}\end{array}}\right). \quad (1)$$

In this 'first round', the purchase transaction amount is $15.00, the user distribution percentage is 50%, the present user threshold level (PUTL) is 1000 and previous user threshold levels is zero; therefore, the distribution to each user D is $7.50, in step 416. Assuming at least 1000 D users make a purchase in this 'first round', B will distribute $3000 to A, $1500 to B (themselves), $3000 to C, and the D users would receive $7,500. Depending on the agreement between B and D as defined when user D creates a user account, the payment of $7.50 for each D user may be accrued in an account for the user allowing the user to use this credit against other digital file purchases, or D would receive a payment for this amount through bank transfer, credit card transfer, electronic transfer, or a mailed check (or any other means currently available or hereinafter available for payment transfers.)

After the funds are distributed, the number of user transactions is incremented by one, in step 418, and the method returns to step 408 to determined if the number of user transactions has exceeded the present user threshold level (PUTL). When the number of user transactions exceeds 1000, the method will go to step 420 where the present user threshold level will be set to the next user threshold level (UTL), e.g., 10,000, and the 'next round' of distribution will begin. In the 'next round', A-D would receive the same payment percentages and the round would apply to the next 10,000 purchasers of the digital content (D) and would also include the original 1000 previous purchasers (D). Thus in this round, A would receive 30,000, B to receive $15000, C to receive $30000, and the 11000 users (i.e., 10,000 of the present UTL plus 1,000 of the previous UTL) would receive $75000 or $6.82 each as determined by the following using formula (1) above:

$$(\$15.00) * 50\% * \left(\frac{10,000}{10,000 + 1,000}\right) = \$6.82$$

In the 'next round', when the number of user transactions exceeds 10,000 in step 408, the present user transaction threshold level will be set to 100,000. A-D will receive the same payment percentages and the round would apply to the next 100000 purchasers of the digital content and would also include the previous 11,000 purchasers. Thus in this round, A would receive $300,000, B to receive $150,000, C to receive $300,000, and the 111,000 users would receive $750,000 or $6.76 each as determined by the following using formula (1) above:

$$(\$15.00) * 50\% * \left(\frac{100,000}{100,000 + 11,000}\right) = \$6.76$$

In this example's final round, A-D would receive the same payment percentages and the round would apply to the last one million purchasers of the digital content and would also include the previous 111,000 purchasers. Thus, in this round, A would receive 3 million dollars, B to receive 1.5 million dollars, C to receive 3 million dollars, and the 1,111,000 purchasers would receive $6.75 each as determined by the following using formula (1) above:

$$(\$15.00) * 50\% * \left(\frac{1,000,000}{1,000,000 + 111,000}\right) = \$6.75$$

The D users will have an incentive to purchase these digital content files as early as possible, because the sooner that they purchase, and the more people they tell about the files, the more money that they make. In the example described above, the first 1000 purchasers of the $15.00 digital content files, would have received $27.83 for a digital file that they paid only $15.00 to purchase.

The system and method of incentivation described herein can also be adjusted so that the early users (i.e., early adopters) of the digital files, would receive even a higher level of compensation so that for instance if a total disbursement was made of several million dollars, the first users of these files could receive a substantial portion of the total revenue.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for distributing digital content files over a network, the method comprising the steps:
receiving by a server of a file agent at least one digital content file from a content provider;
selecting a plurality of user threshold levels, the user threshold levels being indicative of the number of times the at least one digital file is downloaded by an end user;
presenting the at least one digital content file for purchase on a website of the server;
downloading the at least one digital content file to at least one end user for a fixed transaction amount;
distributing a first distribution amount of the fixed transaction amount to the content provider; and
distributing a second distribution amount of the fixed transaction amount to the at least one end user at a time of purchase by the at least one end user;

determining the number of times the at least one digital content file has been purchased and downloaded; and upon reaching each of the plurality of user threshold levels, distributing a subsequent distribution amount to an end user of each previous user threshold level, the subsequent distribution amount being in addition to a distribution amount received for each of the previous user threshold levels, wherein determining the subsequent distribution amount includes:

selecting a user distribution percentage; and determining the subsequent distribution amount by the following formula:

$$\left(\begin{array}{c}\text{purchase transaction}\\ \text{amount}\end{array}\right) * \left(\begin{array}{c}\text{user distribution}\\ \text{percentage}\end{array}\right) * \left(\frac{\text{present user threshold level } (PUTL)}{PUTL + \begin{array}{c}\text{previous user}\\ \text{threshold levels}\end{array}}\right).$$

2. The method as in claim 1, further comprising distributing a third distribution amount of the transaction amount to the file agent of the server.

3. The method as in claim 2, wherein the presenting step includes posting a location of the at least one digital content file by a distributor and the method further comprising the step of distributing a fourth distribution amount of the transaction amount to the distributor.

4. The method as in claim 3, wherein the distribution amounts are determined by distribution percentages, further comprising the steps:

selecting the first, second, third and fourth distribution percentages by the content provider; and approving the distribution percentages by the file agent of the server.

5. The method as in claim 3, wherein the distribution amounts are electronically negotiated between the content provider and the file agent.

6. The method as in claim 1, wherein the at least one digital content file is an audio file, a video file, a multimedia file, a text file, or a software application.

7. The method as in claim 1, wherein the downloading step further comprises:

encrypting the at least one digital file before downloading; and transmitting a code to the at least one user for decrypting the at least one digital file after receiving the transaction amount from the at least one user.

8. The method as in claim 1, wherein the distributing step includes payment by checks, credits to bank accounts, wire transfer, issuance of cash redemption cards or payment by a payment agent.

9. The method as in claim 1, wherein the distributing step includes issuance of credits to a user account to be used for additional services provided by file agent.

10. A server for distributing digital content files over a network comprising:

a communication device for receiving at least one digital content file from a content provider; and a processor which selects a plurality of user threshold levels, the user threshold levels being indicative of the number of times the at least one digital file is downloaded by an end user, presents the at least one digital content file for purchase on a website of the server, downloads the at least one digital content file via the communication device to at least one end user for a fixed transaction amount, distributes a first distribution amount of the fixed transaction amount to the content provider, and distributes a second distribution amount of the fixed transaction amount to the at least one end user at a time of purchase by the at least one end user, wherein the processor determines the number of times the at least one digital content file has been purchased and downloaded and, upon reaching each of the plurality of user threshold levels, distributes a subsequent distribution amount to an end user of each previous user threshold level, the subsequent distribution amount being in addition to a distribution amount received for each of the previous user threshold levels, wherein the processor selects a user distribution percentage, and determines the subsequent distribution amount by the following formula:

$$\left(\begin{array}{c}\text{purchase transaction}\\ \text{amount}\end{array}\right) * \left(\begin{array}{c}\text{user distribution}\\ \text{percentage}\end{array}\right) * \left(\frac{\text{present user threshold level } (PUTL)}{PUTL + \begin{array}{c}\text{previous user}\\ \text{threshold levels}\end{array}}\right).$$

11. The server as in claim 10, wherein the processor retains a third distribution amount of the transaction amount.

12. The server as in claim 11, wherein the processor transmits a location of the at least one digital content file to a distributor and to distribute a fourth distribution amount of the transaction amount to the distributor.

13. The server as in claim 10, wherein the at least one digital content file is an audio file, a video file, a text file, a multimedia file or a software application.

14. The server as in claim 10, further comprising a storage device for storing the at least one digital content file.

15. The server as in claim 10, further comprising a storage device for storing a plurality of user accounts, each user account maintaining distributed credits for each user.

16. The server as in claim 10, wherein the processor includes at least one encryption algorithm for encrypting the at least one digital file before downloading.

17. The server as in claim 16, wherein the processor transmits a code to the at least one user via the communication device for decrypting the at least one digital file after receiving the fixed transaction amount from the at least one user.

18. A method for distributing digital content files over a network, the method comprising the steps:

providing a web site for distributing digital content files hosted by at least one server in communication with the network;

receiving by the at least one server at least one digital content file from a content provider;

selecting a plurality of user threshold levels indicative of a number of times the at least one digital content file is downloaded;

presenting the at least one digital content file on the web site for purchase;

downloading the at least one digital content file to at least one end user for a fixed transaction amount;

determining a number of times the at least one digital content file has been purchased and downloaded;

distributing a first distribution amount of the fixed transaction amount to the content provider;

distributing a second distribution amount of the fixed transaction amount to the at least one end user at a time of purchase by the at least one end user, wherein the distributing a second distribution amount includes payment by checks, credits to bank accounts, wire transfer, issuance of cash redemption cards or payment by a payment agent of the at least one server; and distributing a third distribution amount of the fixed transaction amount to the at least one server;

wherein upon reaching each of the plurality of user threshold levels, distributing a subsequent distribution amount to an end user of each previous user threshold level, the subsequent distribution amount being in addition to a distribution amount received for each of the previous user threshold levels, wherein determining the subsequent distribution amount includes:

selecting a user distribution percentage;

selecting a plurality of user threshold levels, the user threshold levels being indicative of the number of times the at least one digital file is downloaded; and determining the subsequent distribution amount by the following formula:

$$\begin{pmatrix} \text{purchase transaction} \\ \text{amount} \end{pmatrix} * \begin{pmatrix} \text{user distribution} \\ \text{percentage} \end{pmatrix} * \begin{pmatrix} \dfrac{\text{present user threshold level } (PUTL)}{PUTL + \text{previous user threshold levels}} \end{pmatrix}.$$

\* \* \* \* \*